(12) United States Patent
Wingett et al.

(10) Patent No.: US 12,490,735 B2
(45) Date of Patent: Dec. 9, 2025

(54) RODENT-PROOF BARRIER MATERIAL AND A METHOD OF MANUFACTURING A RODENT-PROOF BARRIER MATERIAL

(71) Applicant: RENTOKIL INITIAL 1927 PLC, Crawley (GB)

(72) Inventors: Gary Wingett, Southampton (GB); Mark Brown, Prestatyn (GB); Robert Shand, Copthorne (GB)

(73) Assignee: Rentokil Initial 1927 PLC, Crawley (GB)

( * ) Notice: Subject to any disclaimer, the term of this patent is extended or adjusted under 35 U.S.C. 154(b) by 150 days.

(21) Appl. No.: 18/037,635

(22) PCT Filed: Nov. 12, 2021

(86) PCT No.: PCT/GB2021/052937
§ 371 (c)(1),
(2) Date: May 18, 2023

(87) PCT Pub. No.: WO2022/106813
PCT Pub. Date: May 27, 2022

(65) Prior Publication Data
US 2024/0023538 A1    Jan. 25, 2024

(30) Foreign Application Priority Data
Nov. 18, 2020  (GB) .................................. 2018101

(51) Int. Cl.
*A01M 29/30*  (2011.01)
(52) U.S. Cl.
CPC .................................. *A01M 29/30* (2013.01)

(58) Field of Classification Search
CPC ........ A01M 29/30; C04B 14/48; C04B 28/04; E04C 5/073; C08L 63/00
USPC .................. 52/101; 248/297.4, 295.7, 298.4
See application file for complete search history.

(56) References Cited

U.S. PATENT DOCUMENTS 4,308,705 A * 1/1982 Hufnagl .................... E04C 5/03
                                                    428/397
5,596,834 A    1/1997 Ritter
6,308,473 B1 * 10/2001 Auck ....................... F24F 7/02
                                                    454/366

(Continued)

FOREIGN PATENT DOCUMENTS

| CN | 104886034 A | 9/2015 |
| CN | 204722119 U | 10/2015 |

(Continued)

OTHER PUBLICATIONS

International Search Report and Written Opinion for International Application No. PCT/GB2021/052937, dated Feb. 22, 2022, 8 pages.

(Continued)

*Primary Examiner* — Paola Agudelo
(74) *Attorney, Agent, or Firm* — Buchanan Ingersoll & Rooney PC

(57) ABSTRACT

A rodent-proof barrier material comprising a settable carrier medium and a plurality of filaments dispersed within the settable carrier medium. Each filament of the plurality of filaments comprises a central curved portion and first and second end portions.

10 Claims, 3 Drawing Sheets

(56) References Cited

U.S. PATENT DOCUMENTS

| | | | |
|---|---|---|---|
| 6,363,653 B1* | 4/2002 | Wong | A01G 13/10 |
| | | | 140/58 |
| 6,877,272 B2* | 4/2005 | Hoshall | A01M 1/245 |
| | | | 43/132.1 |
| 2004/0003547 A1* | 1/2004 | Beedle | E04D 1/365 |
| | | | 52/101 |
| 2009/0000216 A1* | 1/2009 | Kane | D04H 1/46 |
| | | | 428/605 |
| 2009/0019793 A1* | 1/2009 | Huber, Jr. | E04B 1/70 |
| | | | 52/101 |
| 2009/0061708 A1* | 3/2009 | Kane | D03D 9/00 |
| | | | 140/9 |
| 2013/0026670 A1* | 1/2013 | Birch | B29C 44/1214 |
| | | | 264/41 |
| 2013/0071586 A1 | 3/2013 | Munzenberger | |
| 2014/0302183 A1* | 10/2014 | Reynolds | A01M 29/18 |
| | | | 514/627 |
| 2017/0283320 A1* | 10/2017 | Kim | E04C 5/012 |
| 2019/0000068 A1 | 1/2019 | Williams | |
| 2020/0131771 A1* | 4/2020 | Almusallam | C04B 14/48 |

FOREIGN PATENT DOCUMENTS

| | | |
|---|---|---|
| FR | 2370839 A1 | 6/1978 |
| GB | 11754 | 5/1915 |
| GB | 1597145 | 9/1981 |
| GB | 2475677 A | 6/2011 |
| JP | 2000102339 A | 4/2000 |
| JP | 2020-156414 A | 10/2020 |

OTHER PUBLICATIONS

Great Britain Search Report for Great Britain Application No. GB2018101.2, dated May 10, 2021, 1 page.

Office Action (The First Office Action) issued May 29, 2025, by the State Intellectual Property Office of People's Republic of China in corresponding Chinese Patent Application No. 202180077724.4 and an English translation of the Office Action. (14 pages).

* cited by examiner

RODENT-PROOF BARRIER MATERIAL AND A METHOD OF MANUFACTURING A RODENT-PROOF BARRIER MATERIAL

CROSS REFERENCE TO RELATED APPLICATIONS

This application is a U.S. National Phase of PCT International Application No. PCT/GB2021/052937, filed Nov. 12, 2021, which claims the benefit of GB Application No. 2018101.2, filed Nov. 18, 2020, the subject matter of each of these applications being incorporated herein by reference in their entireties for all purposes.

FIELD OF THE INVENTION

The present invention concerns a rodent-proof barrier material, and a method of manufacturing a rodent-proof barrier material. More particularly, but not exclusively, the invention concerns a rodent-proof barrier material comprising a settable carrier medium having a plurality of filaments dispersed within it.

BACKGROUND OF THE INVENTION

It is common for gaps and voids in the walls of buildings and the like to be filled using barrier materials such as polymeric filler, resin or caulk. However, it is a disadvantage of such barrier materials that they can be damaged by rodents, potentially allowing the rodents entry into the gap or void, or into the building itself.

GB 2475677 A published 1 Jun. 2011 discloses a barrier material comprising a carrier substrate and a plurality of wire strands distributed within the carrier substrate. The carrier substrate is susceptible to pest damage, and the distribution of wire strands within the carrier substrate provides the barrier material with an increased resistance to pest damage in relation to the resistance to pest damage provided by the carrier material alone.

It would be advantageous to provide a barrier material that is more effective at resisting damage by rodents.

The present invention seeks to solve and/or mitigate some or all the above-mentioned problems. Alternatively and/or additionally, the present invention seeks to provide improved rodent-proof barrier materials, and improved methods of manufacturing a rodent-proof barrier material.

SUMMARY OF THE INVENTION

In accordance with a first aspect of the invention there is provided a rodent-proof barrier material comprising:
   a settable carrier medium; and
   a plurality of filaments dispersed within the settable carrier medium;
   wherein each filament of the plurality of filaments comprises a central curved portion and first and second end portions.

By having a plurality of filaments dispersed within the settable carrier medium, the barrier material can be used provide a barrier to rodents, as the rodents the filaments prevent the rodents from gnawing or otherwise damaging the barrier material. This is due to the teeth and/or claws of the rodent not being able to exert sufficient force to break through the filaments, and/or the filaments causing damage and/or discomfort to the teeth/claws of the rodents to deter it from damaging the barrier material. It has been found that a filament comprising a curved portion with first and second end portions is particularly effective at preventing damage by rodents. This may be due to the shape of the filaments being such that a rodent is unable to avoid the sharp end of a filament coming into contact with their teeth/mouth/feet. It also may be that the shape of the filaments means that they tend to become entangled, so providing a more difficult barrier for a rodent to break through, as individual filaments cannot be easily removed from the settable carrier medium by the rodent.

The central curved portion of each filament may span an angle of at least 90°, or at least 120°, or at least 180°, or at least 270°. More than 50%, more than 80%, or more than 95% of filaments dispersed within the settable carrier medium may span an angle of at least 90°, or at least 120°, or at least 180°, or at least 270°.

Preferably the settable carrier medium comprises a polymer. Preferably, the settable carrier medium comprises a silicone-based polymer. Silicone-based polymers are preferable because they are generally fast setting, flexible, odourless and fire retardant. In other embodiments of the invention, the settable carrier medium may be formed of other materials.

At least some of the plurality of filaments may have first and second end portions that point in substantially the same direction. At least some of the plurality of filaments may be U-shaped. More than 50%, more than 80%, or more than 95% of filaments dispersed within the settable carrier medium may have first and second end portions that point in substantially the same direction, and may be U-shaped.

At least some of the plurality of filaments may have first and second end portions that point in substantially opposite directions. At least some of the plurality of filaments may be capital-Omega-shaped. In particular, at least some of the plurality of filaments may have a central curved portion that spans an angle of at least 180°, or at least 270°, and then end portions that curve in the opposite direction to the central curved portion so that the ends of the end portions distant from the central curved portion point away from each other. More than 50%, more than 80%, or more than 95% of filaments dispersed within the settable carrier medium may have first and second end portions that point in substantially opposite directions, and may be capital-Omega-shaped.

More than 50%, more than 80%, or more than 95% of filaments dispersed within the settable carrier medium may be one of: filaments having first and second end portions that point in substantially the same direction, filaments that are U-shaped, filaments having first and second end portions that point in substantially opposite directions, or filaments that are capital-Omega-shaped.

Preferably, the filaments are substantially rigid. By being substantially rigid, the filaments hold their shape in use, for example under the forces applied when the rodent-proof barrier material is pressed into a gap.

Advantageously, at least some of the plurality of filaments may be entangled with each other. This makes it difficult for a rodent to remove a single filament from the barrier material.

Preferably, the plurality of filaments are formed of stainless steel wire. However, in other embodiments of the invention the plurality of filaments may be formed of other materials.

In accordance with a second aspect of the invention there is provided a method of manufacturing a rodent-proof barrier material as described above, comprising the steps of:
   providing a mesh formed of interlocking loops of metal wire;

cutting the metal wire of the mesh between the interlocking loops to form a plurality of filaments;
providing a settable carrier medium,
combining the plurality of filaments with the settable carrier medium so that the plurality of filaments are distributed throughout the carrier.

This provides a particularly convenient and efficient way of forming the plurality of filaments of the shape required by the invention. A single cut can be made through multiple rows of interlocking loops, thus enabling multiple filaments to be cut from the mesh in one go.

Advantageously, the mesh may be a knitted mesh. The shape into which the wire forming the mesh is formed by the knitting process means that, when the interlocking loops are separated by cutting, the resulting filaments are capital-Omega-shaped.

It will of course be appreciated that features described in relation to one aspect of the present invention may be incorporated into other aspects of the present invention. For example, the method of the invention may incorporate any of the features described with reference to the product of the invention and vice versa.

DESCRIPTION OF THE DRAWINGS

Embodiments of the present invention will now be described by way of example only with reference to the accompanying schematic drawings of which.

DETAILED DESCRIPTION

A rodent-proof barrier material in accordance with an embodiment of the invention is now described with reference to FIGS. 1 to 3.

Figure 1:
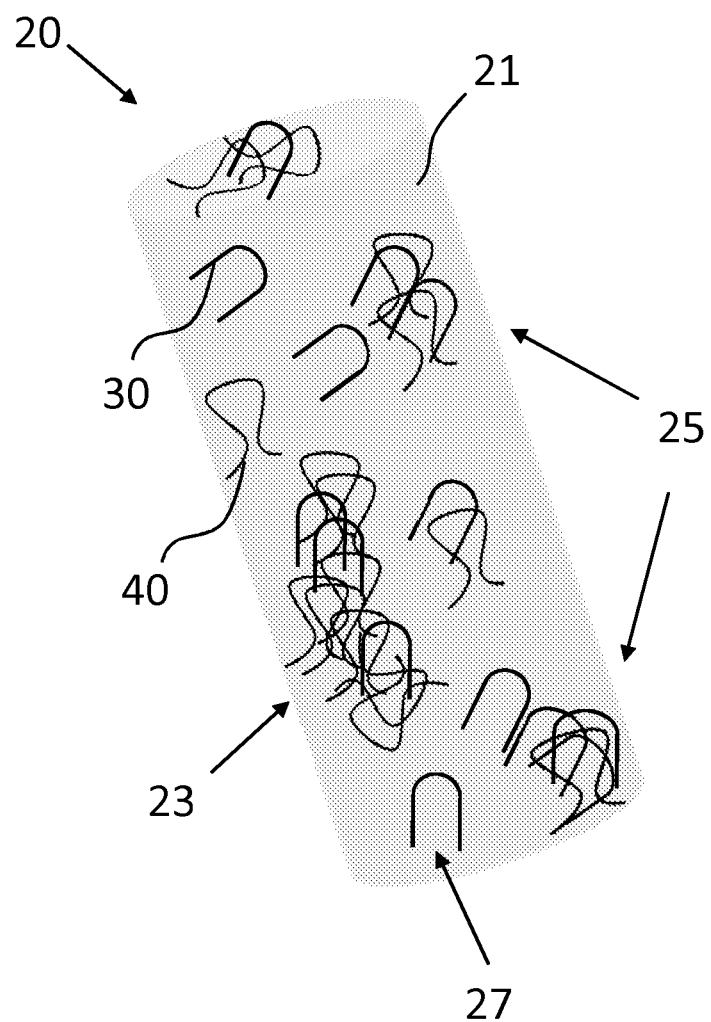
FIG. 1 shows a rodent-proof barrier material in accordance with an embodiment of the invention.

FIG. 1 shows the rodent-proof barrier material 20, which comprises a settable silicone-based carrier 21. While the carrier 21 is shown as a cylinder, it will be appreciated that the carrier 21 is a malleable material, which can be moulded by pressure to fill a void or gap.

The rodent-proof barrier material 20 further comprises a plurality of filaments 30, 40, distributed throughout the carrier 21. The filaments 30, 40 are formed from short lengths of metal wire, and as can be seen each filament 30, 40 comprises a curved portion. The filaments 30, 40 are described in more detail below.

The filaments 30, 40 are distributed throughout the carrier 21. Generally, the filaments 30, 40 are distributed largely evenly throughout the carrier 21. However, first regions of the carrier 21 such as region 23 may comprise a relatively large number of entangled filaments 30, 40. Other regions of the carrier 21 such as region 27 comprise only a single filaments 30, 40. Other regions of the carrier 21 such as region 27 may comprise only a single filament 30 that is not entangled with any other filaments.

Figure 3:
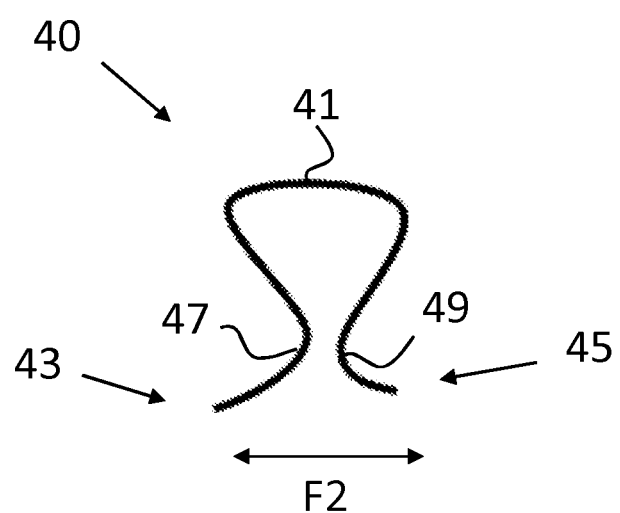
FIG. 3 shows a second filament of the rodent-proof barrier material of FIG. 1.

A first filament 30 of the rodent-proof barrier material 20 is shown in FIG. 3. As mentioned above, the filament 30 is formed of a short length of metal wire. The filament 30 is formed in a U-shape, with a central curved portion 31 that is a semi-circle, and so spans an angle of 180°, with straight end portions 33 and 35, the ends of which point in substantially the same direction. The material of the filament is stainless steel, but it will be appreciated that many other suitable materials could be used, including metals and non-metals. The filament 30 is relatively rigid so that it does not bend easily. The filament 30 is 3 mm wide across the width F1 of its arch, and 5 mm in length. However, it will be appreciated that filaments of various other dimensions could be used.

Figure 4:
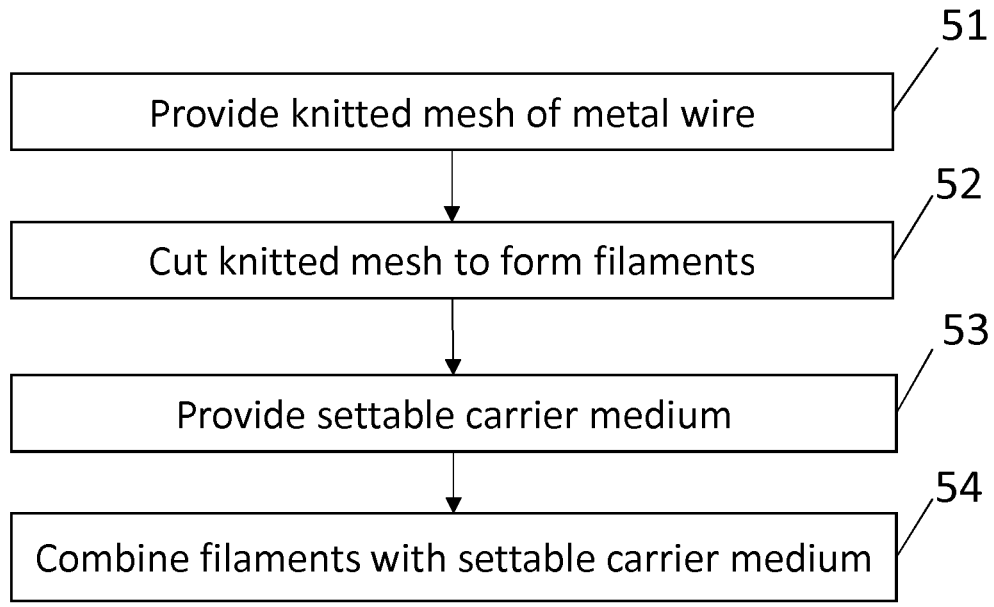
FIG. 4 is a flowchart describing a method of manufacturing a rodent-proof barrier material in accordance with an embodiment of the invention.

A second filament 40 of the rodent-proof barrier material 20 is shown in FIG. 4. Again, the filament 40 is formed of a short length of metal wire, the metal being stainless steel. Similarly to the filament 30, the filament 40 comprises a central curved portion 41 with end portions 43 and 45. However, the filament 40 is not formed in a U-shape, but rather in the shape of a capital Greek letter Omega (Ω). The central curved portion 41 spans an angle of roughly 270°, so that it curves inwards to points 47 and 49, and the filament 40 then curves outwards again so that the ends of the end portions 43 and 45 of the filament 40 point in substantially opposite directions, rather than pointing in substantially the same direction as in the filament 30. The filament 40 is a similar size to the filament 30, being 3 mm wide between the ends 43 and 45, and 4 mm in length. Again, it will be appreciated that filaments of various other materials and dimensions could be used.

The manufacture of a rodent-proof barrier material in accordance with an embodiment of the invention, such as the rodent-proof barrier material 20 of the embodiment described above, is now described with reference to FIG. 5.

Figure 5:
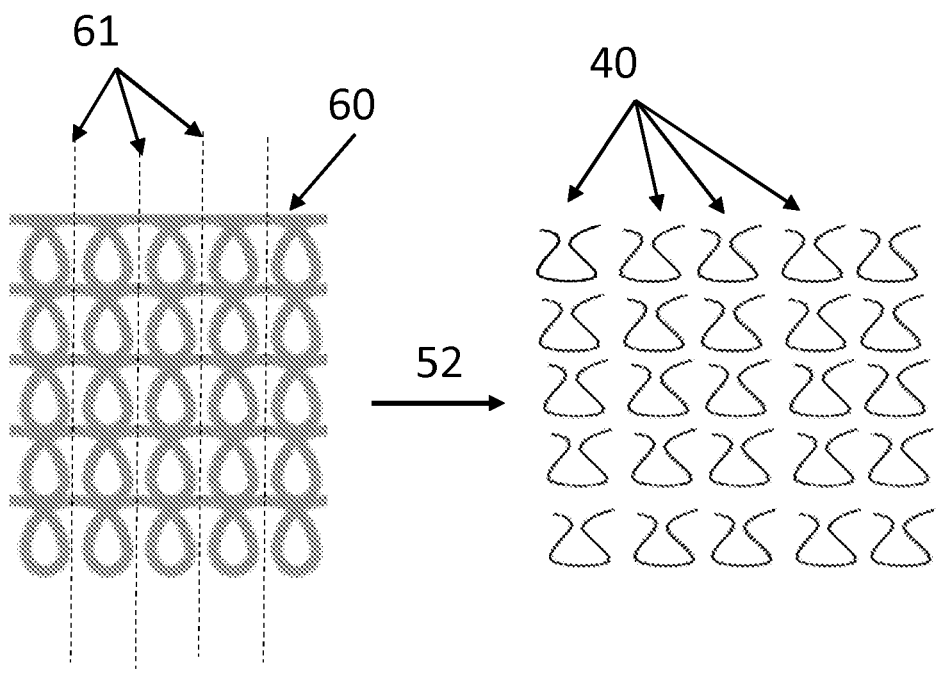
FIG. 5 is a schematic depiction of the manufacture of filaments in the method of FIG. 4.

First step, a knitted mesh 60 is provided (step 51). The kitted mesh 60 is shown in FIG. 5, and comprises a length of metal wire, formed into interlocking rows of loops so as to form a mesh.

Next, the metal wire of the knitted mesh 60 is cut between the loops of the metal wire that form the mesh (step 52). This causes the loops to separate from each other, forming capital Greek letter Omega-shaped filaments 40.

Next, a settable carrier medium is provided, such as the carrier 21 which is formed of a silicone polymer (step 53). The filaments 40 formed in step 52 are then combined with the carrier, so that they are distributed throughout the carrier to produce the rodent-proof barrier material.

It will be appreciated that in embodiments of the invention, filaments may be produced by additional or alternative methods, for example to form the U-shaped filaments 30 of the embodiment of the invention described above. All the filaments produced are then distributed throughout the carrier to produce a rodent-proof barrier material.

While the present invention has been described and illustrated with reference to particular embodiments, it will be appreciated by those of ordinary skill in the art that the invention lends itself to many different variations not specifically illustrated herein.

Figure 2:
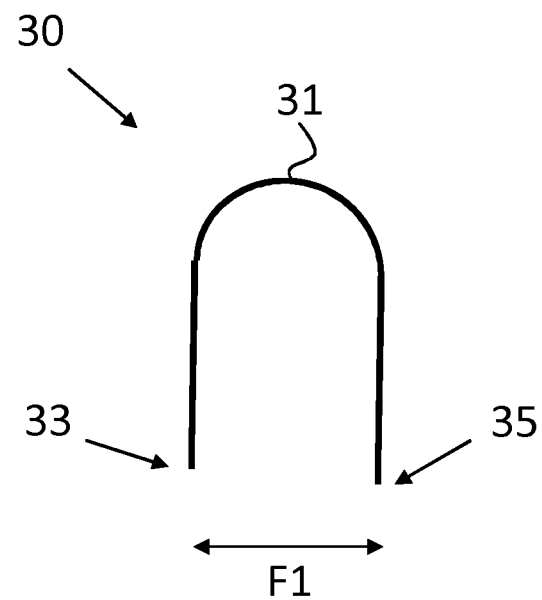
FIG. 2 shows a first filament of the rodent-proof barrier material of FIG. 1.

In particular, while the embodiment of FIGS. 1 to 3 comprises filaments 30, of two different types, it will be appreciated that filaments of only a single type, or filaments or more than two types, may be used in other embodiments of the invention.

While filaments formed of stainless steel wire are described, filaments of other materials, for example others metals, or other materials such as plastics or Kevlar, for example, may be used in other embodiments of the invention.

While a settable carrier medium of silicone polymer is described, any other suitable carrier material may be used in other embodiments of the invention.

It will be appreciated that, as well as comprising filaments in accordance with the invention, a rodent-proof barrier material in accordance with an embodiment of the invention may also comprise other filaments, such as a straight section of wire. Ideally such filaments will be small in number, and may be introduced unintentionally (e.g. resulting from the edges of a mesh when filaments are produced by cutting the mesh), or may be introduced intentionally.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A rodent-proof barrier material comprising:
   a settable carrier medium comprising a polymer;
   a plurality of filaments dispersed within the settable carrier medium;
   wherein each filament of the plurality of filaments comprises a central curved portion and first and second end portions, wherein for more than 50% of the plurality of filaments, the respective central curved portion spans an angle of at least 180°.

2. The rodent-proof barrier material as claimed in claim 1, wherein at least some of the plurality of filaments have first and second end portions that point in substantially the same direction.

3. The rodent-proof barrier material as claimed in claim 2, wherein at least some of the plurality of filaments are U-shaped.

4. The rodent-proof barrier material as claimed in claim 1, wherein at least some of the plurality of filaments have first and second end portions that point in substantially opposite directions.

5. The rodent-proof barrier material as claimed in claim 4, wherein at least some of the plurality of filaments are capital-Omega-shaped.

6. The rodent-proof barrier material as claimed in claim 1, wherein the filaments are substantially rigid.

7. The rodent-proof barrier material as claimed in claim 1, wherein at least some of the plurality of filaments are entangled with each other.

8. The rodent-proof barrier material as claimed in claim 1, wherein at least some of the plurality of filaments are formed of stainless steel wire.

9. A method of manufacturing a rodent-proof barrier material as claimed in claim 1, comprising the steps of:
   providing a mesh formed of interlocking loops of metal wire;
   cutting the metal wire of the mesh between the interlocking loops to form a plurality of filaments;
   providing the settable carrier medium,
   combining the plurality of filaments with the settable carrier medium so that the plurality of filaments are distributed throughout the carrier.

10. The method as claimed in claim 9, wherein the mesh is a knitted mesh.

* * * * *